(12) United States Patent
Dawson

(10) Patent No.: US 8,867,350 B2
(45) Date of Patent: Oct. 21, 2014

(54) METHOD AND APPARATUS FOR PACKET BUFFERING MEASUREMENT

(75) Inventor: John E. Dawson, Vancouver, WA (US)

(73) Assignee: Avaya Inc., Basking Ridge, NJ (US)

( * ) Notice: Subject to any disclaimer, the term of this patent is extended or adjusted under 35 U.S.C. 154(b) by 141 days.

(21) Appl. No.: 13/555,649

(22) Filed: Jul. 23, 2012

(65) Prior Publication Data

US 2014/0023069 A1 Jan. 23, 2014

(51) Int. Cl.
*H04L 12/26* (2006.01)
*H04L 12/815* (2013.01)

(52) U.S. Cl.
CPC .................................... *H04L 47/22* (2013.01)
USPC ...................................... 370/230.1; 370/232

(58) Field of Classification Search
CPC ........ H04L 47/10; H04L 47/22; H04L 47/225
USPC ................................................. 370/229–236
See application file for complete search history.

(56) References Cited

U.S. PATENT DOCUMENTS

| | | | |
|---|---|---|---|
| 6,324,165 B1 * | 11/2001 | Fan et al. | 370/232 |
| 2002/0194343 A1 * | 12/2002 | Shenoi et al. | 709/227 |
| 2003/0174700 A1 * | 9/2003 | Ofek et al. | 370/389 |
| 2006/0184670 A1 * | 8/2006 | Beeson et al. | 709/224 |
| 2012/0039173 A1 * | 2/2012 | Danzig et al. | 370/235.1 |

FOREIGN PATENT DOCUMENTS

| | | |
|---|---|---|
| EP | 2204950 A1 | 7/2010 |
| EP | 2362589 A1 | 8/2011 |
| WO | WO03023707 A2 | 3/2003 |

OTHER PUBLICATIONS

IBM, Buffer Size Measuring Equipment for WAN, ip.com Journal, ip.com Inc., Sep. 3, 2008, XP013126024, ISSN: 1533-001, 3 pages.
James W. Hong, "Tu18, Interne Traffic Monitoring and Analysis: Methods and Applications", Global Telecommunications Conference Workshops, 2004. Globecom Workshops 2004. IEEE Dalas, TX, USA Nov. 29-Dec. 3, 2004, Piscataway, NJ, USA, IEEE, Nov. 29, 2004, pp. 1-63, XP002609903.
European Search Report, Oct. 24, 2013, Applcation No. 12185284.2-1862, 9 pages.

* cited by examiner

*Primary Examiner* — Kerri Rose
(74) *Attorney, Agent, or Firm* — Anderson Gorecki & Rouille LLP

(57) ABSTRACT

A method, apparatus and computer program product for packet buffering measurement is presented. A plurality of packets are transmitted to a packet switching device. Packets are received from the packet switching device. A determination is made, with respect to a particular time, based on packets transmitted to the packet switching device and packets received from the packet switching device, regarding a number of packets being held in a memory of the packet switching device.

11 Claims, 7 Drawing Sheets

FIGURE 3A
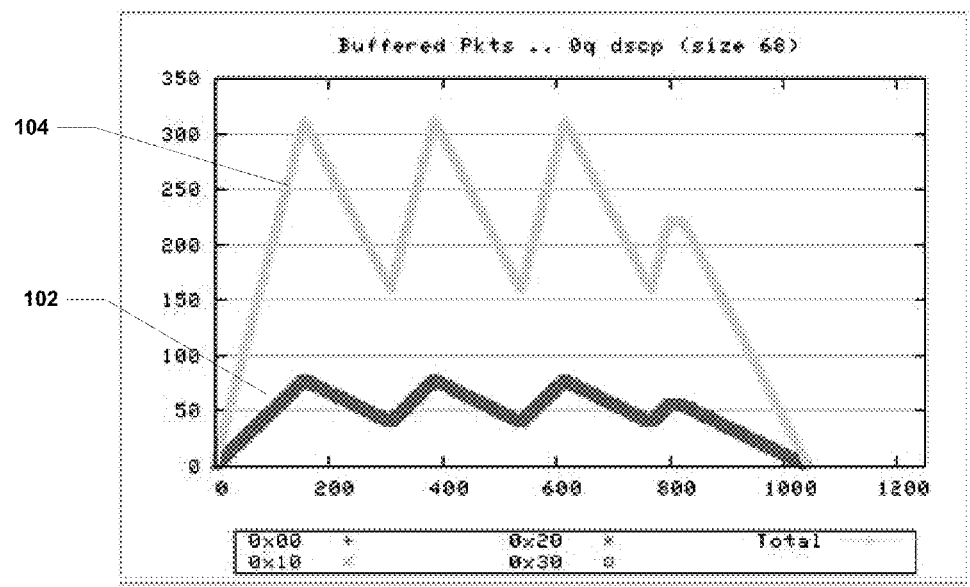
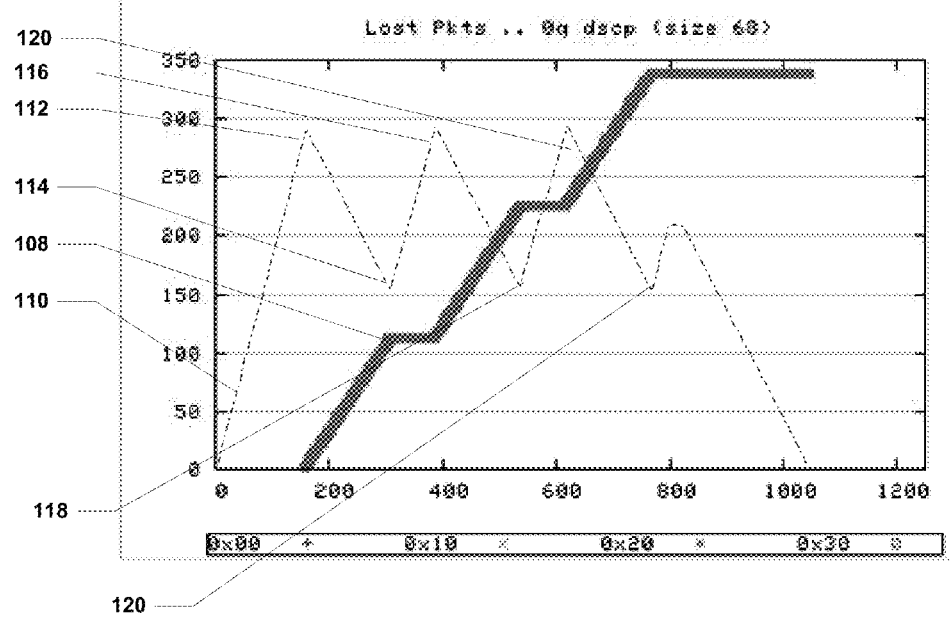
FIGURE 3C

FIGURE 4B
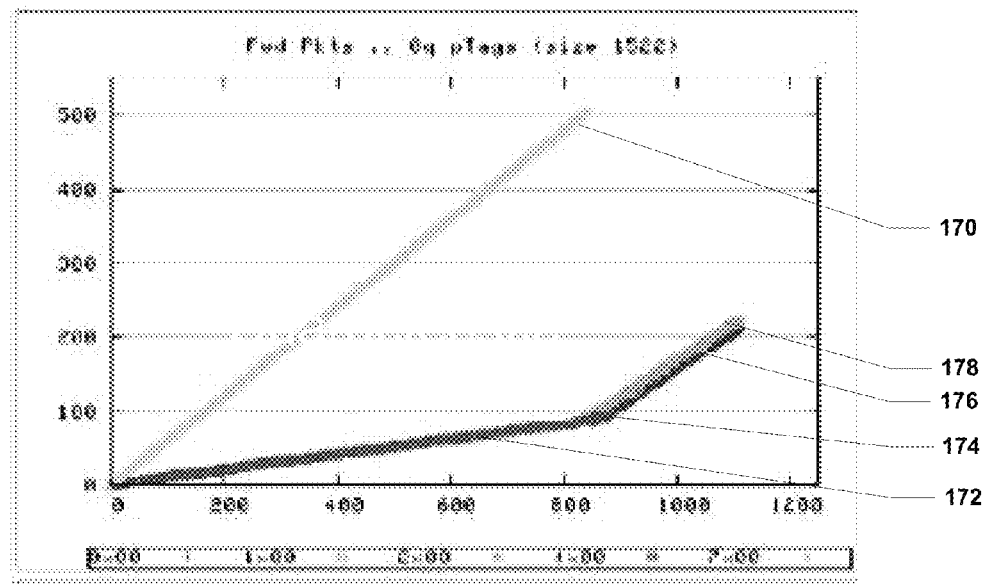
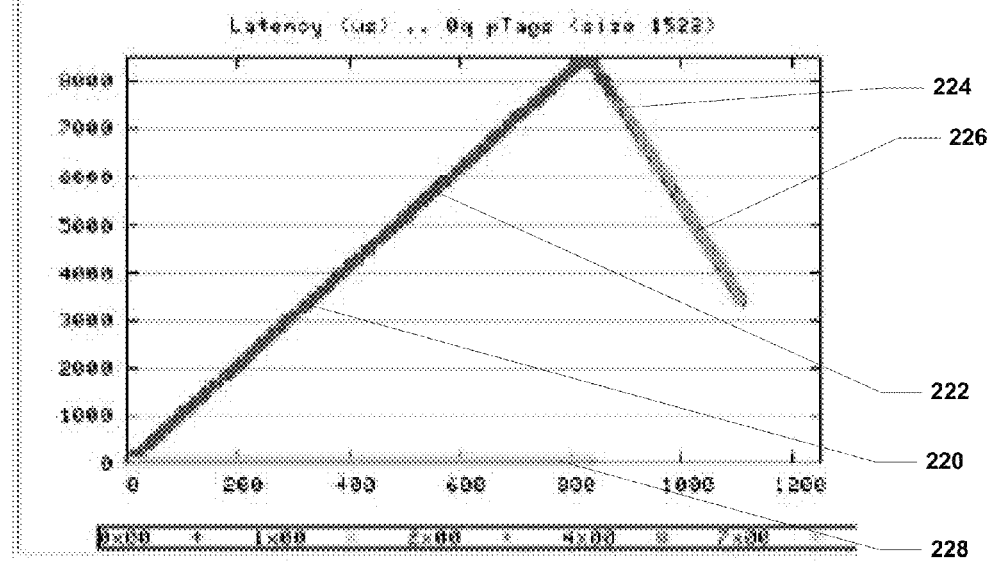
FIGURE 4D

METHOD AND APPARATUS FOR PACKET BUFFERING MEASUREMENT

BACKGROUND

Data communication networks may include various computers, servers, nodes, routers, switches, hubs, proxies, and other devices coupled to and configured to pass data to one another. These devices are referred to herein as "network elements," and may provide a variety of network resources on a network. Data is communicated through data communication networks by passing protocol data units (such as packets, cells, frames, or segments) between the network elements over communication links on the network. A particular protocol data unit may be handled by multiple network elements and cross multiple communication links as it travels between its source and its destination over the network. Hosts such as computers, telephones, cellular telephones, Personal Digital Assistants, and other types of consumer electronics connect to and transmit/receive data over the communication network and, hence, are users of the communication services offered by the communication network.

One particular type of network element is referred to herein as a packet switching device such as a data switch or a router. A packet switching device receives data at a particular port, and outputs the data at one or more other ports onto other links on the network. A typical analysis of a packet switching device will look at a number of packets forwarded, a number of packets dropped, and an average latency (a measurement of how long it takes a packet to traverse a packet switching device). The commercial practice is to provide details on forwarding rates, loss rates, and latency.

SUMMARY

Conventional mechanisms such as those explained above suffer from a variety of deficiencies. The typical analysis does not define or explain the relationship between forwarding, loss, and latency or have linked latency into a direct measurement of packet buffering capabilities. Prior solutions cannot explain why a latency number is high or low—they can make that measurement but they can't explain that number. Prior solutions can also not validate that the performance expected is being met in terms of kilobytes of packet buffering per port.

The present invention provides the capability to directly measure the buffering capacity of a packet switching device, such as how many packets can a device hold before it starts to drop packets. The resulting information can be used to graphically illustrate Quality of Service (QOS) principles, validate QOS characteristics, and highlight impacts associated with QOS settings that can be made.

Packet switched networks are typically bursty with lots of merging, exiting, and crossing traffic. Variable packet rates handled by the packet switches or routers lead to variable delay among packets going from one source location to a particular destination. This variable delay among packets is known as jitter. These techniques are also very good for explaining jitter measurements—why is the jitter level for data traversing a box (or system) at a specific value.

The measurements for a loss-less situation answer a slightly different but related question—how many packets can a packet switching device hold before it signals congestion (and causes other devices to pause). Without including the ability to measure buffer depths in the overall process, it is extremely difficult to make sense of the data typically provided in standard measurement processes. There is also no practical method to validate that the amount of memory (cache) included in a product design is actually being properly used.

In a particular embodiment of a method for providing packet buffering measurement the method includes transmitting a plurality of packets to a packet switching device. The method further includes receiving packets from the packet switching device. Additionally, the method includes determining at a particular time, based on packets transmitted to said packet switching device and packets received from said packet switching device, a number of packets being held by said packet switching device.

Other embodiments include a computer readable medium having computer readable code thereon for providing packet buffering measurement. The computer readable medium includes instructions for transmitting a plurality of packets to a packet switching device. The computer readable medium further includes instructions for receiving packets from the packet switching device. Additionally, the computer readable medium includes instructions for determining at a particular time, based on packets transmitted to said packet switching device and packets received from said packet switching device, a number of packets being held by said packet switching device.

Still other embodiments include a computerized system, configured to process all the method operations disclosed herein as embodiments of the invention. In such embodiments, the computerized system (e.g., a test system including a traffic generator and a traffic receiver) each of the traffic generator and traffic receiver includes a memory system, a processor, and a communications interface in an interconnection mechanism connecting these components. The memory system is encoded with a process that provides packet buffering measurements as explained herein that when performed (e.g. when executing) on the processor, operates as explained herein within the test system to perform all of the method embodiments and operations explained herein as embodiments of the invention. Thus any computerized device that performs or is programmed to perform the processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing packet buffering measurements as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Basking Ridge, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3A is a graph showing the amount of buffered packets in a device under test in accordance with embodiments of the invention;

FIG. 3C is a graph showing the amount of lost packets in a device under test in accordance with embodiments of the invention;

FIG. 4B is a graph showing the amount of forwarded packets in a device under test in accordance with embodiments of the invention;

FIG. 4D is a graph showing the latency for packets in a device under test in accordance with embodiments of the invention.

DETAILED DESCRIPTION

Figure 1:
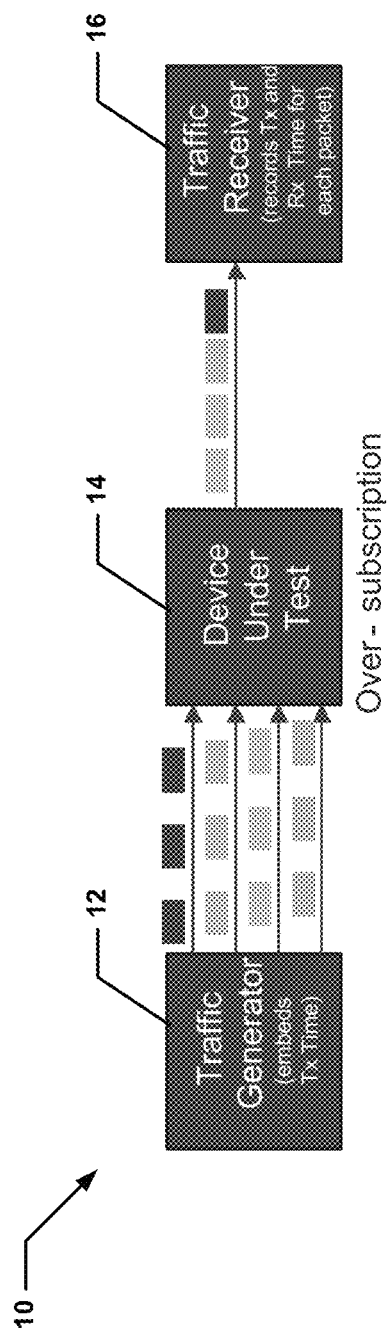
FIG. 1 is a block diagram of a test system used for performing packet buffering measurements in accordance with embodiments of the invention.

The embodiments set forth below represent the necessary information to enable those skilled in the art to practice the invention and illustrate the best mode of practicing embodiments of the invention. Upon reading the following description in light of the accompanying figures, those skilled in the art will understand the concepts of the invention and recognize applications of these concepts not particularly addressed herein. It should be understood that these concepts and applications fall within the scope of the disclosure and the accompanying claims.

The presently described method and apparatus for packet buffering measurements illustrates a way to directly estimate/measure the number of packets being held in the forwarding queues of a switch or router. This is accomplished by expanding upon time-stamp information typically embedded into packet flows for latency measurement purposes. Rather than simply examining the difference in the transmit time and the receive time (standard latency measure), the time-stamp information is used to keep a running total of the number of packets in flux (being held in buffers in the packet switching device under test) at any given moment in time. Once a determination is made regarding the number of packets that have been transmitted but not yet received, and whether those packets are ultimately received is tracked, then a determination can be made regarding exactly how many packets are being held in the forwarding queue (memory) of a packet switching device, and illustrate how those forwarding queues are serviced (which queue(s) gets priority treatment). This concept is similar to super-position theory in circuit analysis—by adding up the combined effect of many individual elements you can create a model for the function as a whole (in this case a packet-switching function). Stated differently, the presently described method and apparatus for packet buffering measurements provides a direct measurement of critical Quality of Service parameters, rather than characterizing the symptoms associated with that Quality of Service settings.

Packet switching devices, such as routers and switches are designed with a certain amount of memory. The memory is typically used to buffer packets when too many packets arrive at the packet switching device and can't be sent out immediately. At a later time, the packets can be taken out of memory and transmitted. The amount of memory in a packet switching device has an associated cost, therefore it is important to insure that the memory is used effectively. For example, if a packet switching device has five megabytes of memory, it is important to insure that all five megabytes are capable of being used if required.

Conventional methods for determining the performance characteristics of a packet switching device include providing a flow of packets to the device, and measuring how many packets were forwarded by the device. This technique however fails to provide information relating to how much of the memory was used to hold the received packets.

The presently described method and apparatus for packet buffering measurements allows a user to determine at any given point in time exactly how much memory is being used by the packet switching device. Also, if packets are being dropped, a determination can be made if it is it due to memory being fully utilized, or if packets are being dropped for some other reason such as misconfigured software setting or the like. Another example occurs when Quality of Service (QoS)

queues are being set up by partitioning the memory wherein a first percentage of memory is used for a high priority queue and a second percentage of the memory used for a low priority queue and there is a desire to verify how those percentages are being used.

An important characteristic of a packet switching device is the measure of latency. Latency is the measurement of how long does it take between the time the packet is first received at the packet switching device and the time the packet is transmitted by the packet switching device. Latency can vary based on QoS. While measuring latency is not overly cumbersome, explaining the cause of the latency number can be difficult. If it is known how many packets a system can buffer, and how the packets are going into the buffers and coming out of the buffers is examined, then a determination can be made that the latency is a certain value, and further the reason for this latency value. By accurately measuring the buffer depth, the latency measurement can be explained. For example, determinations can be made regarding is the device getting all the memory expected, how is it being used/distributed between high priority and low priority traffic, how is data going into the device, and how is data coming out of the device.

Referring to FIG. 1, a particular embodiment of a test system 10 for providing packet buffering measurements is shown. The test system 10 includes a traffic generator 12 which provides packets to a packet switching device under test 14, and a traffic receiver 16 for receiving traffic from the packet switching device under test 14. The traffic generator 12 creates an oversubscription condition by sending traffic on a plurality of ports (four ports are used in this example but it should be understood that any number of ports could be used). The packets received by the packet switching device under test 14 are all destined for the same single port. Each packet transmitted by the traffic generator 12 has a transmit time embedded therein. The receiver 16 records the time that the packet was received as well as the transmit time of the packet. Other information may also be recorded such as the transmit port number, the QoS value (high or low priority) and the transmit port number. Each packet typically has a sequence number, and missing sequence numbers indicate which packets have been dropped (dropped packets are not re-transmitted).

Figure 2:
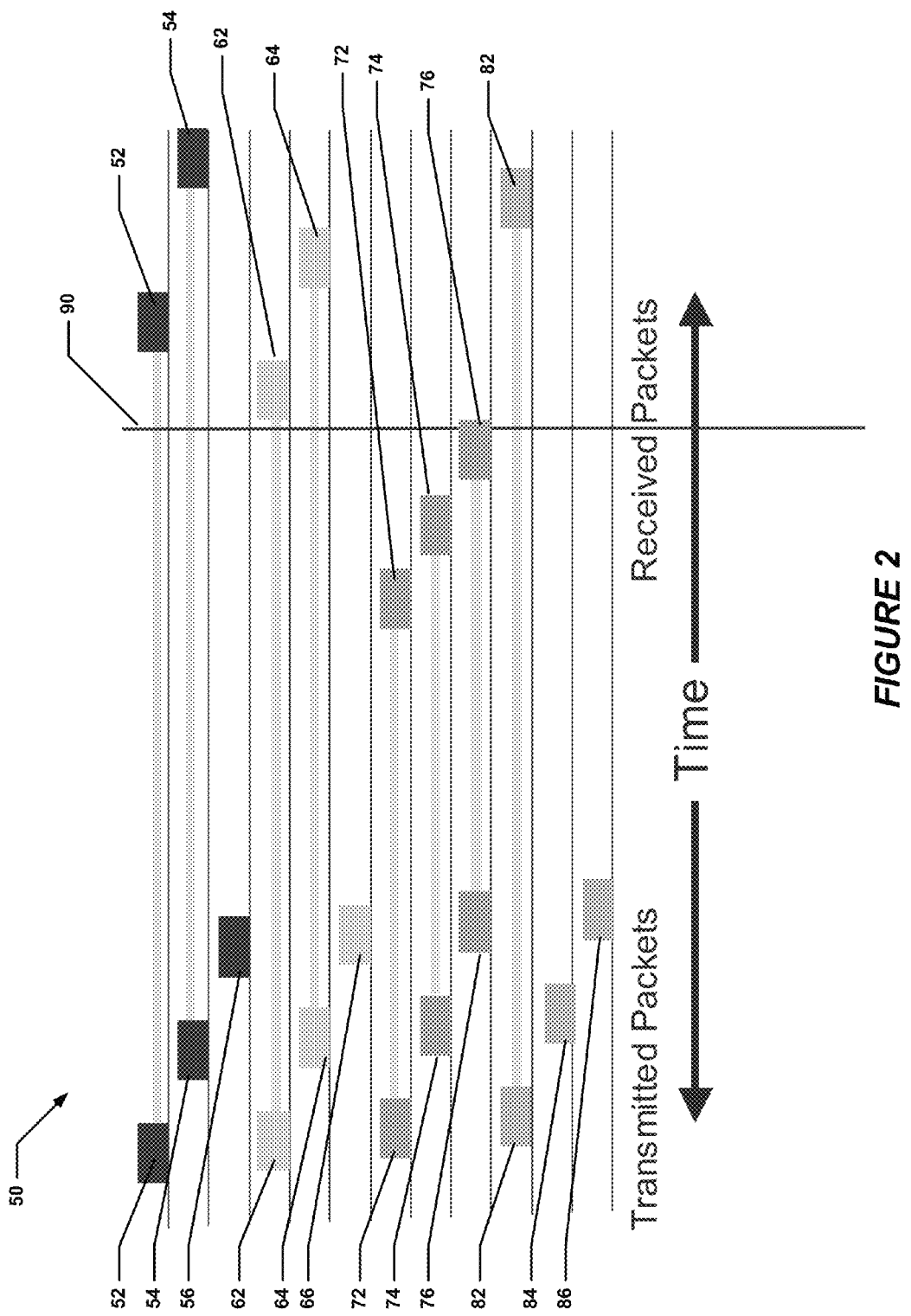
FIG. 2 comprises a timing diagram showing a number of transmitted packets and a number of received packets at a particular time.

Referring now to FIG. 2, a timing diagram 50 is shown. On the left side of the timing diagram transmitted packets are shown, and on the rights side of the diagram received packets are shown. In this example, packets are transmitted on four ports. The first port transmitted packets 52, 54 and 56. The second port transmitted packets 62, 64 and 66. The third port transmitted packets 72, 74 and 76. The fourth port transmitted packets 82, 84 and 86. The packets are transmitted almost simultaneously, in order to produce an over subscription condition at the device under test (packet switching device). At a particular time, indicated by timeline 90, it can be seen that only packets 72 and 74 have been received, and packet 76 has almost been entirely received. The other packets have not been received at this time. This indicates that the packets transmitted on the third port have a higher priority value than the other packets transmitted on the first, second and fourth ports. Looking past the timeline 90 it can be seen that packet 62, although transmitted slightly after packet 52 is received before packet 52, similar to packet 64 being received prior to packet 54. Packet 82, transmitted before packet 64, is received after packet 64. From this diagram we can detect that packets sent from the third port of the traffic generator to the device under test are processed by the device under test at a higher priority than traffic from other ports of the traffic generator. Further, packets sent from the second port of traffic generator to the device under test are processed by the device under test at a higher priority than traffic sent from first and fourth ports of the traffic generator and packets sent from the first port of traffic generator to the device under test are processed by the device under test at a higher priority than traffic from the fourth port of the traffic generator.

Referring now to FIGS. 3A through 3D, four graphs are shown that relate to a non-QoS example device. For the graphs of FIGS. 3A through 3D, the horizontal axis is the number of packets received. For the graphs of FIGS. 3A through 3C, the vertical axis is a count of the number of packets. For FIG. 3D the vertical axis is a measure of latency represented in units of time. For FIG. 3A, line 102 represents the number of packets buffered for each of the four ports. In this example, all four ports are receiving equal treatment (the same number of packets at approximately the same time), so the lines all lay directly on top of each other. Line 104 is the total number of buffered packets. As can be seen by line 104, the maximum number of packets is slightly over 300, and as shown in line 102, the maximum number of buffered packets for each stream is around 75 to 80 packets.

Figures 3B, 3D:
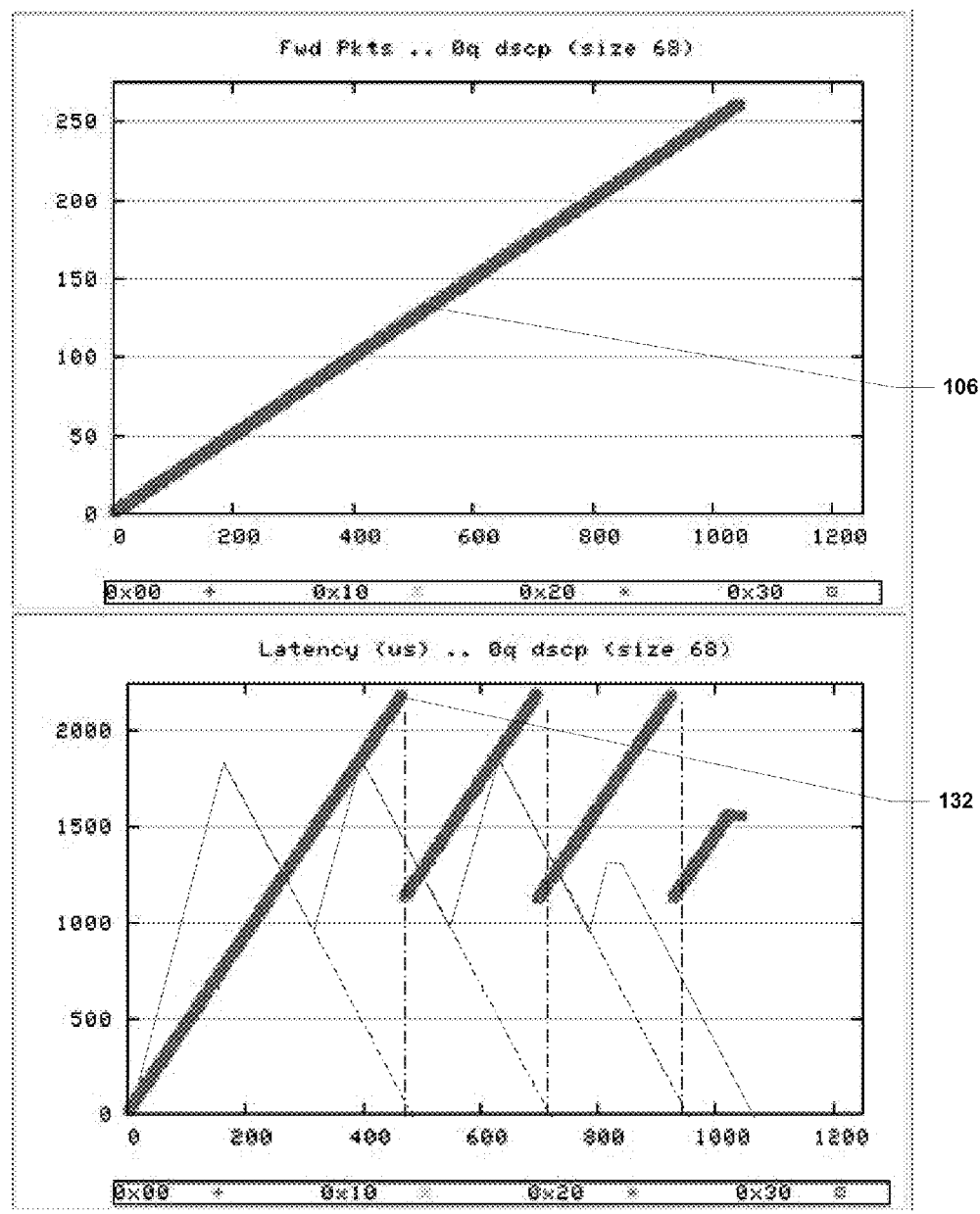
FIG. 3B is a graph showing the amount of forwarded packets in a device under test in accordance with embodiments of the invention.
FIG. 3D is a graph showing the latency for packets in a device under test in accordance with embodiments of the invention.

Referring now to FIG. 3B, line 106 shows the number of forwarded packets for the device. Because this is a non-QoS environment wherein each packet is treated equally, the line is linear. A little over 1,000 packets were forwarded, with a little over 250 for each of the four streams.

Referring now to FIG. 3C, a graph showing the amount of lost packets is presented. Line 108 represents the measured packet loss, while dashed line 110 shows the number of buffered packets (see line 104 of FIG. 3A). At first, no packets are being dropped, as everything is going into buffers. This graph shows that as a buffer hits its maximum (112), the buffer will not accept any additional packets, and the amount of lost packets begins to grow. The buffer will be drained to a low threshold (114), after which, the buffers will begin to fill again and packets are not continuously lost until the buffer reaches it's upper threshold again ((116) where this repeats, as the amount of lost packets increases until the buffer is drained to it's low threshold (118). This happens again as once the buffer reaches its high threshold (120) and packets are lost until the buffer is drained to its low threshold 122. From this a user can see what the high level threshold is for a buffer and also what the low threshold is for the buffer.

FIG. 3D is a graph showing the latency of the device. Latency is a measurement of how long it takes a packet to traverse the packet switching device. As packets are filling up the buffers, a high threshold is hit. These packets have to drain completely out of the buffer. Even though the buffer will start refilling at the low threshold point, the last packet received at the high threshold point will be transmitted at point 132. The time from a packet stored in a buffer at the high threshold point to zero defines the peak latency. From this graph a user can see why and when the latency hits a high point, why the line 130 has a saw-tooth shape.

Referring now to FIGS. 4A through 4D, four graphs are shown that relate to a QoS example device. For the graphs of FIGS. 4A through 4D, the horizontal axis is the number of packets received. For the graphs of FIGS. 4A through 4C, the vertical axis is a count of the number of packets. For FIG. 4D the vertical axis is a measure of latency represented in units of time. Here there are five streams of data at different priorities.

Figures 4A, 4C:
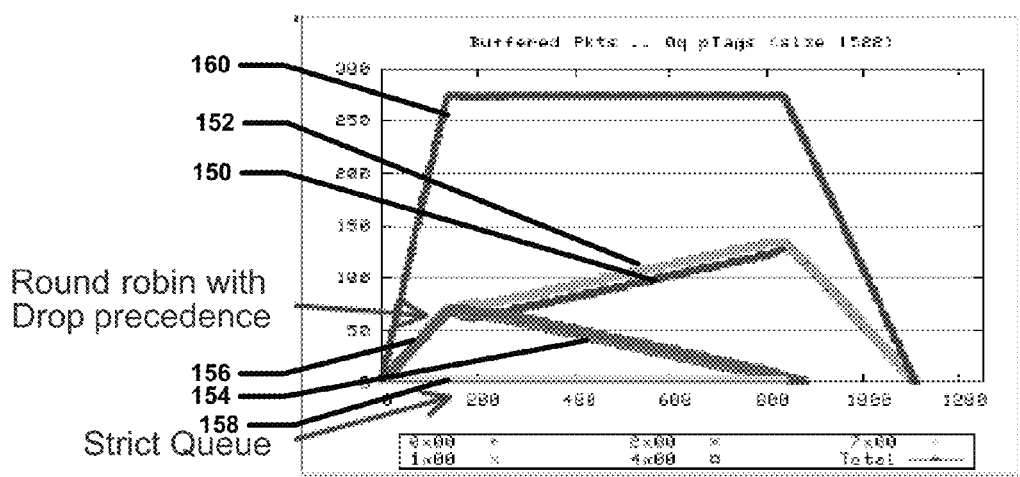
FIG. 4A is a graph showing the amount of buffered packets in a device under test in accordance with embodiments of the invention.
FIG. 4C is a graph showing the amount of lost packets in a device under test in accordance with embodiments of the invention.

Referring to FIG. 4A, a two-tiered Quality of Service implementation is represented. The highest priority streams (line 158 in FIG. 4A) pass through the system immediately such that no significant buffering is required; these streams require the least amount of buffering as they are held for the least amount of time. The second tier of service is represented by lines 150, 152, 154, and 156. Since the packet switch is over-subscribed, and these streams are treated at a lower priority, they must be held by buffers internal to the packet switch until such time that there is no high-priority traffic present. The switch buffers therefore fill up to a maximum value (represented by line 160) at which point no more packets can be held and packets start to drop. As packets are pulled out of the buffers and transmitted, packets associated with certain streams will continue to fill newly available buffers, as shown by steady increases in lines 150 and 152. Other streams (represented by lines 154 and 156) are not allowed to re-fill buffers as they become available due to drop-precedence settings on the switch.

The above explanation is further supported by forwarded packets (FIG. 4B), lost packets (FIG. 4C), and latency (FIG. 4D).

The highest priority streams (line 158 in FIG. 4A), have the greatest number of forwarded packets (line 170 in FIG. 4B), no lost packets in FIG. 4C, and the lowest latency (line 228 in FIG. 4D). The fact that these packets are not allowed to collect in any significant quantities in internal packet buffers, means they essentially pass right through the switch and hence have almost no latency.

The second highest priority streams (lines 150 and 152 in FIG. 4A) have the second highest number of forwarded packets (lines 176 and 178 in FIG. 4B) but latency similar to the lowest priority packets which share the second-tier queue.

It can also be see that the onset of lost packets (lines 202, 204, 206, and 208 in FIG. 4C) does not occur until the aggregate buffering (line 160 in FIG. 4A) reaches its maximum value.

The system described above also works with loss-less devices. In a loss-less system the buffers will fill up. When buffers fill up to a predetermined threshold, a message is sent to the traffic source telling it to pause its transmitter. As a result there are no lost packets, but transmit times start having a gap. Accordingly, packets versus packets can't be graphed, so the X axis of the resulting graph(s) becomes time. The resulting information can be used to determine whether a pause was sent to the transmitter at the right time.

Figure 5:
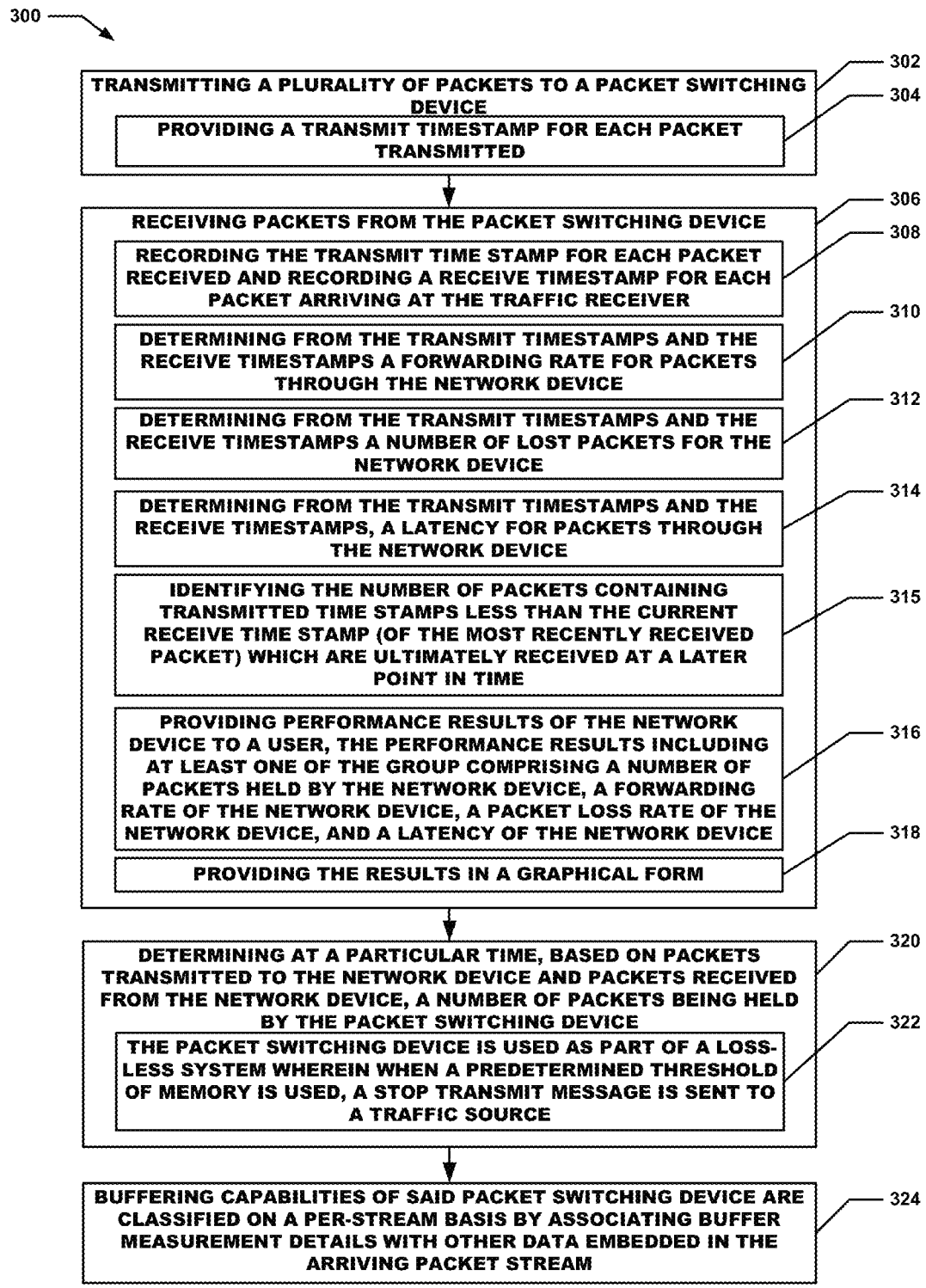
FIG. 5 is a flow diagram of a particular embodiment of a method of performing packet buffering measurements in accordance with the present invention.

A flow chart of a particular embodiment of the presently disclosed method 300 is depicted in FIG. 5. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Method 300 begins with processing block 302 which discloses transmitting a plurality of packets to a packet switching device. A packet switching device can be a data switch or a router. In a packet switching device data is received on an input port and switched to one or more output ports. As shown in processing block 302, a transmit timestamp is provided for each packet transmitted.

Processing block 306 recites receiving packets from the packet switching device. An over-subscription condition is reached internally by the packet switch wherein the packets are received across multiple ports faster than they can be transmitted out a fewer number of ports, resulting in the memory of the packet switching device filling up with packets.

Processing block 308 recites recording the transmit time stamp for each packet arriving at the traffic receiver. Other information (sequence numbers, QoS levels, transmit port number, etc.) may also be recorded.

Processing block 310 discloses determining a forwarding rate for packets through the packet switching device from the transmit timestamps, the receive timestamps, and any additional information (sequence numbers, QoS levels, transmit port number, stream numbers, etc.) associated with the incoming packets. The forwarding rate is based on the amount of packets that made it through the packets switching device.

Processing block 312 states determining a number of lost packets for the packet switching device from the transmit timestamps, the receive timestamps, and any additional information (sequence numbers, QoS levels, transmit port number, stream numbers, etc.) associated with the incoming packets. Lost packets are packets that were dropped by the packet switching device and appear as gaps in sequence numbers, transmitted time-stamps, or other details in the incoming streams. These lost packets can be a result of memory being exhausted, improper partitioning of memory between various QOS queues, or improper packet handling of one form or another. By examining buffer characteristics against loss characteristics it is possible to discern whether this packet loss is expected or unexpected.

Processing block 314 recites determining a latency for packets forwarded through the packet switching device from the transmit timestamps, the receive timestamps, and any additional information (sequence numbers, QoS levels, transmit port number, stream numbers, etc.) associated with the incoming packets.

Processing block 315 discloses providing performance results of packets buffered by the packet switching device by identifying the number of packets containing transmitted time stamps less than the current receive time stamp (of the most recently received packet) which are ultimately received at a later point in time. Buffer depths for the packet switch can be further characterized using additional information (sequence numbers, stream numbers, QoS levels, transmit port numbers, etc.) embedded in the received packet.

Processing block 316 discloses providing performance results of the packet switching device to a user, the performance results including at least one of the group comprising a number of packets held by the packet switching device, a forwarding rate of the packet switching device, a packet loss rate of the packet switching device, and a latency of the packet switching device. These results provide the user with a deeper understanding of exactly what is happening in the packet switching device.

Processing block 318 states the providing performance results to a user comprises providing the results in a graphical form. The graphs provide an easily understood and visual representation of how the packet switching device is performing, and showing different characteristics which can allow a user to change settings in order to maximize performance of the packet switching device.

Processing continues with processing block 320 which recites determining at a particular time, based on packets transmitted to the packet switching device and packets received from the packet switching device, a number of packets being held in a memory of the packet switching device. This shows the depth of the memory (buffers) of the device.

Processing block 322 discloses the packet switching device is used in a loss-less manner wherein when the packet switching device has a predetermined number of packets in memory a stop transmit message is sent to the traffic generator. In a loss-less system the buffers will fill up. When buffers fill up, a message is sent to the traffic source telling it to pause its transmitter. As a result there are no lost packets, but transmit times start having a gap. Accordingly, packets versus packets can't be graphed, so the X-axis of the resulting graph(s) becomes time. The resulting information can be used to determine whether a pause was sent to the transmitter at the right time.

Processing block 324 states buffering capabilities of the packet switching device are classified on a per-stream basis by associating buffer measurement details with other data embedded in the arriving packet stream. The other data can include, for example, sequence numbers, QoS levels, transmit port numbers and the like.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method comprising:
    transmitting a plurality of packets to a packet switching device;
    receiving packets from said packet switching device; and
    determining at a particular time, based on packets transmitted to said packet switching device and packets received from said packet switching device, a number of packets being held in a memory of said packet switching device,
    wherein said transmitting a plurality of packets to a packet switching device includes providing a transmit timestamp for each packet transmitted,
    wherein said receiving packets from said packet switching device further comprises recording said transmit time stamp for each packet received and recording a receive timestamp for each packet arriving at said packet switching device
    wherein determining from said transmit timestamps and said receive timestamps one of: a forwarding rate for packets through said packet switching device, a number of lost packets for said packet switching device, a latency for packets through said packet switching device.

2. The method of claim 1 further comprising providing performance results of said packet switching device to a user, said performance results including at least one of the group comprising a number of packets held by said packet switching device, a forwarding rate of said packet switching device, a packet loss rate of said packet switching device, and a latency of said packet switching device.

3. The method of claim 2 wherein said providing performance results to a user comprises providing said results in a graphical form.

4. The method of claim 1 wherein said packet switching device is used in a loss-less manner wherein when said packet switching device has a predetermined number of packets in memory a stop transmit message is sent to the traffic generator.

5. The method of claim 1 wherein buffering capabilities of said packet switching device are classified on a per-stream basis by associating buffer measurement details with other data embedded in the arriving packet stream.

6. A non-transitory computer readable storage medium having computer readable code thereon for packet buffering measurement, the medium including instructions in which a computer system performs operations comprising:
   transmitting a plurality of packets to a packet switching device;
   receiving packets from said packet switching device; and
   determining at a particular time, based on packets transmitted to said packet switching device and packets received from said packet switching device, a number of packets being held in a memory of said packet switching device,
   wherein said transmitting a plurality of packets to a packet switching device includes providing a transmit timestamp for each packet transmitted,
   wherein said receiving packets from said packet switching device further comprises recording said transmit time stamp for each packet received and recording a receive timestamp for each packet arriving at said packet switching device
   wherein determining from said transmit timestamps and said receive timestamps one of: a forwarding rate for packets through said packet switching device, a number of lost packets for said packet switching device, a latency for packets through said packet switching device.

7. The computer readable storage medium of claim 6 further comprising providing performance results of said packet switching device to a user, said performance results including at least one of the group comprising a number of packets held by said packet switching device, a forwarding rate of said packet switching device, a packet loss rate of said packet switching device, and a latency of said packet switching device.

8. The computer readable storage medium of claim 7 wherein said providing performance results to a user comprises providing said results in a graphical form.

9. The computer readable storage medium of claim 6 wherein said packet switching device is used in a loss-less manner wherein when said packet switching device has a predetermined number of packets in memory a stop transmit message is sent to the traffic generator.

10. The computer readable storage medium of claim 6 wherein buffering capabilities of said packet switching device are classified on a per-stream basis by associating buffer measurement details with other data embedded in the arriving packet stream.

11. A computer system comprising:
   a memory;
   a processor;
   a communications interface;
   an interconnection mechanism coupling the memory, the processor and the communications interface; and
   wherein the memory is encoded with an application providing packet buffering measurement, that when performed on the processor, provides a process for processing information, the process causing the first AP to perform the operations of:
   transmitting a plurality of packets to a packet switching device;
   receiving packets from said packet switching device; and
   determining at a particular time, based on packets transmitted to said packet switching device and packets received from said packet switching device, a number of packets being held in a memory of said packet switching device,
   wherein said transmitting a plurality of packets to a packet switching device includes providing a transmit timestamp for each packet transmitted,
   wherein said receiving packets from said packet switching device further comprises recording said transmit time stamp for each packet received and recording a receive timestamp for each packet arriving at said packet switching device
   wherein determining from said transmit timestamps and said receive timestamps one of: a forwarding rate for packets through said packet switching device, a number of lost packets for said packet switching device, a latency for packets through said packet switching device.

* * * * *